United States Patent [19]

Waldhofer

[11] 4,384,846
[45] May 24, 1983

[54] BURNER

[75] Inventor: Reinhard Waldhofer, Essen, Fed. Rep. of Germany

[73] Assignee: Krupp-Koppers GmbH, Essen, Fed. Rep. of Germany

[21] Appl. No.: 178,710

[22] Filed: Aug. 12, 1980

[30] Foreign Application Priority Data

Oct. 23, 1979 [DE] Fed. Rep. of Germany ....... 2942726

[51] Int. Cl.³ ................................................ F23Q 9/00
[52] U.S. Cl. .................................. 431/284; 431/350; 239/132.3; 239/397.5; 239/434
[58] Field of Search ............... 431/160, 186, 284, 350; 239/128, 132.1, 132.3, 397.5, 434

[56] References Cited

U.S. PATENT DOCUMENTS

| | | | |
|---|---|---|---|
| 2,965,163 | 12/1960 | Lange et al. | 239/397.5 |
| 2,973,150 | 2/1961 | Golec | 239/397.5 |
| 3,076,607 | 2/1963 | Cordier | 239/397.5 X |
| 3,255,966 | 6/1966 | Hoffert et al. | 239/397.5 X |
| 3,642,060 | 2/1972 | Hlinka | 239/132.3 X |
| 3,644,076 | 2/1972 | Bagge | 431/284 |
| 4,154,056 | 5/1979 | Emory | 239/397.5 X |
| 4,292,022 | 9/1981 | Hosek | 431/170 |

Primary Examiner—Samuel Scott
Assistant Examiner—Margaret A. Focarino
Attorney, Agent, or Firm—Michael J. Striker

[57] ABSTRACT

A burner for gaseous and liquid fuels includes a hollow water cooled casing and a hollow water cooled jacket surrounding the casing. Two respective channels are formed in the burner for feeding fuel and oxygen-containing medium to a nozzle of the burner. The casing and the jacket form at their proximal ends a conical annular nozzle gap which receives a plurality of circumferentially distributed spacing elements. The spacing elements form between themselves a plurality of slots for discharging a combustible mixture of fuel and oxygen-containing medium from the nozzle gap. A heat-expansion compensator is provided in the burner which connects the casing with the jacket in axially prestressed position so that the casing is always in abutment with the jacket in the area of the nozzle gap via the spacing elements.

8 Claims, 2 Drawing Figures

BURNER

BACKGROUND OF THE INVENTION

The present invention relates to a burner for gaseous or liquid fuels. The known burners normally include a cooled hollow casing and a cooled hollow jacket surrounding the casing so that concentrically positioned annular channels for feeding fuel and oxygen-containing gas to a burner nozzle are formed therein.

The conventional burners are preferably utilized in the industry as heating burners for gasification installations operating under pressure. The burner of the conventional type is ignited when the pressureless condition occurs within the interior of the gasifier but thereafter, in operation, the burner must withstand internal pressures occured in the gasifier which can reach 15 bars. The ratio between the internal pressures within the gasifier and the inlet pressures of the burners must be set up during the entire heating process so as to secure stable supercritical outlet velocities of the combustible fluids discharged from the nozzle of the burner.

It has been established that various thermal expansions occured in the inner hollow casing and the jacket surrounding the same may result in mutual displacement of these elements against one another in the region of the burner nozzle which can lead to increasing of the nozzle gap or increasing of the width of the slots between the elements forming the nozzle gap of the burner. This leads to reducing outlet velocities of combustible fluids discharged from the burner nozzle which velocities fall below the required supercritical velocities. The result of this is a possibility of backflash ignition which may cause damage of the burners.

It is therefore desirable to maintain the outlet velocities of the combustible mixture discharged from the burner nozzle at substantially permanent optimal level.

SUMMARY OF THE INVENTION

It is therefore an object of the invention to provide a burner which avoids by simple means the aforementioned disadvantages encountered in the prior art.

Another object of the invention is to provide an improved burner which can be easily adapted to different temperature conditions.

Still another object of the invention is to provide an improved burner in which slots formed in the nozzle of the burner for discharging the combustible mixture therefrom are so adjusted that they have the permanent width.

These and other objects of the invention are attained by a burner for gaseous and liquid fuels comprising a cooled hollow casing including a first annular channel for feeding a fuel therethrough, a cooled hollow jacket surrounding the casing and having a second annular channel for feeding an oxygen-containing medium therethrough, the casing and the jacket having proximal ends which define with one another a conical annular nozzle gap, the first and second channels communicating with said nozzle gap, a plurality of circumferentially distributed spacing elements positioned in the nozzle gap and forming between themselves respective slots for discharging a mixture of the fuel and the oxygen-containing medium from the nozzle gap, and a heat-expansion compensator connecting the jacket to the casing in axially prestressed position so as to maintain said jacket and said casing in abutment with one another via the spacing elements in all operating conditions.

The compensator has one end rigidly secured to the jacket and the other end rigidly connected to the casing.

The casing may be formed with a channel to receive cooled water to be circulated in the casing.

The jacket may be provided with a channel to accommodate cooled water to be circulated in said jacket.

The casing may include a front plate positioned at said proximal end thereof which has an outer conical surface and the jacket may be formed with an inner conical surface at its proximal end which inner conical surface defines with said outer conical surface the annular nozzle gap which receives the spacing elements.

The burner may further include adjusting means operative for limiting displacement of the casing when the compensator is expanded from its prestressed position.

These adjusting means may include two bolts axially extended at two opposite sides of the casing and two nuts mounted thereon.

The first and second channels provided in the burner for fuel and oxygen-containing medium, respectively, may be arranged in communication with each other within the burner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
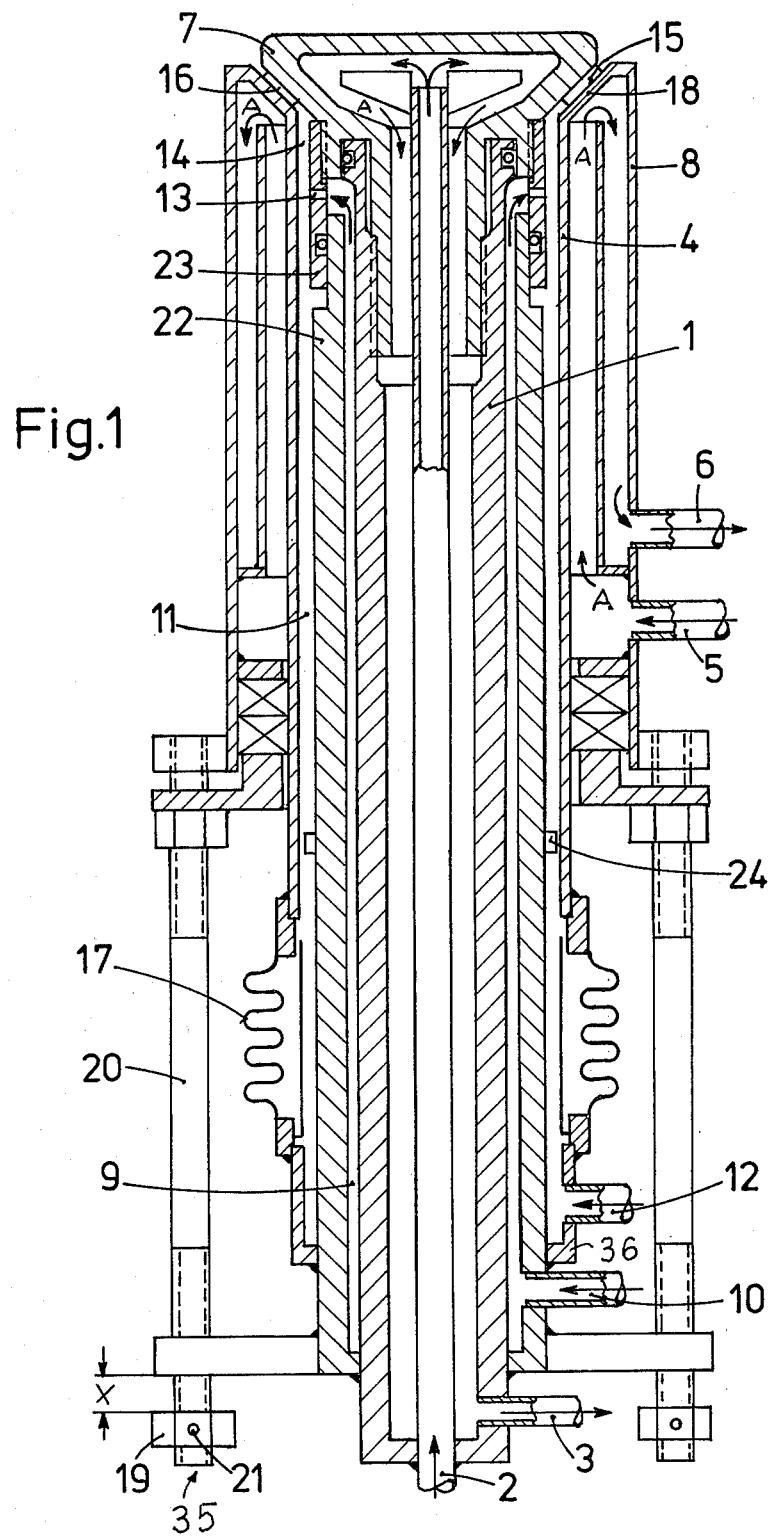
FIG. 1 is an axial sectional view through a burner according to the first embodiment of the invention.

A burner illustrated in FIG. 1 which may be utilized for liquid fuels, comprises a hollow cylindrical casing 22 with a hollow cylindrical body 1 positioned therein. The water cooled hollow body 1 is provided with a cooled water inlet 2 and water outlet 3 for cooling the burner during the operation. A substantially cylindrical water cooled jacket 4 surrounds the casing 22 at the upper portion thereof. The jacket 4 is formed with a cooled water inlet 5 and cooled water outlet 6. The circulation of the cooled water within the casing 22 and jacket 4 is shown by arrows A. A front plate 7 is mounted at the front end of the casing 22 and rigidly secured thereto, for example by thread. The cooled water circulation provided in the burner serves for substantial cooling of the front plate 7 subjected to overheating. An outer pipe 8 of the jacket 4 is also cooled by a circulating water. A fuel inlet 10 is formed at the lower end of the casing 22 for feeding fuel through a channel 9 formed between the inner surface of the casing 22 and the outer surface of the body 1. An inlet 12 for oxygen-containing medium (air or oxygen) is provided in a bottom portion 36 which portion is rigidly connected, for example by means of welding, to the casing 22. The oxygen-containing medium is supplied to a channel 11 provided between the jacket 4 and the casing 22. A number of bores 13 are formed in a sleeve 23 to communicate channel 9 with channel 11. The liquid fuel fed toward the front end of the burner flows through the bores 13 into a mixing chamber 14 wherein the fuel is mixed with the oxygen-containing medium received from the channel 11 to form a combustible mixture. The front plate 7 has a conical outer surface which forms with a respective conical portion 18 formed in the jacket 4 a tapering gap which constitutes a burner nozzle.

A number of circumferentially distributed spacing elements 16 are positioned in the nozzle gap so that a number of slots are provided therebetween which slots form channels for discharging the combustible mixture of fuel and oxygen (or air) from the burner.

As clearly seen in FIG. 1, the jacket 4 is connected to the casing 22, (particularly to the bottom portion 36) by means of a compensator 17 which ends are rigidly secured to the jacket 4 as well as to the casing 22, respectively, for example by means of welding. The compensator 17 which is made of heat resistant material is assembled in the burner in a prestressed position and operates to press by its displacement force the body 1 and the front plate 7 secured thereto against the conical portion 18 of the jacket 4 so that they are maintained in the abutting relationship with each other via the elements 16.

The compensator is a bellows of conventional type expanded or contracted due to temperature fluctuations.

An adjusting arrangement generally designated 35 is provided in the burner. This arrangement includes two threaded bolts 20 axially extending at both sides of the burner and two hexagonal nuts 19 mounted thereon. By displacing of the nuts 19 along the bolts 20, the casing 22 with the body 1 and the front plate 7 is moved upwardly and lifted from the conical portion 18 of the jacket 4. In this lifted position, the front plate which is subjected to excessive wear, may be easily removed from the burner and replaced by another front plate. After this replacement the nuts 19 are rotated back to their initial position and are secured in this position by means of pins or pegs 21.

The compensator 17 may freely contract or expand under influence of various temperature fluctuations to absorb heat expansions of the casing 22 with the body 1 and the jacket 4. During the displacement of the compensator 17, the outer wall of the casing 22 between the channels 9 and 11 moves in the sleeve 23.

The length of the compensator 17 defines the contact pressure exerted on the conical surface of the front plate 7 and on the conical portion 18 of the jacket 4. The larger is the working surface of the compensator, the larger is the above-mentioned contact pressure. The contact pressure on the front plate 7 is increased proportionally to increasing of inner pressures of the oxygen-containing medium contained in the channel 11.

Guide rails 24 are provided in the casing 22 which together with bolts 20 secure the compensator 17 against radial and torsional loads. A dimension designated as X in FIG. 1 defines the maximal magnitude of the path of the compensator together with its thermal expanding (or contracting). The hexagonal nuts 19 serve for limiting the displacement of the compensator and for securing the compensator against inadmissible expansions.

Figure 2:
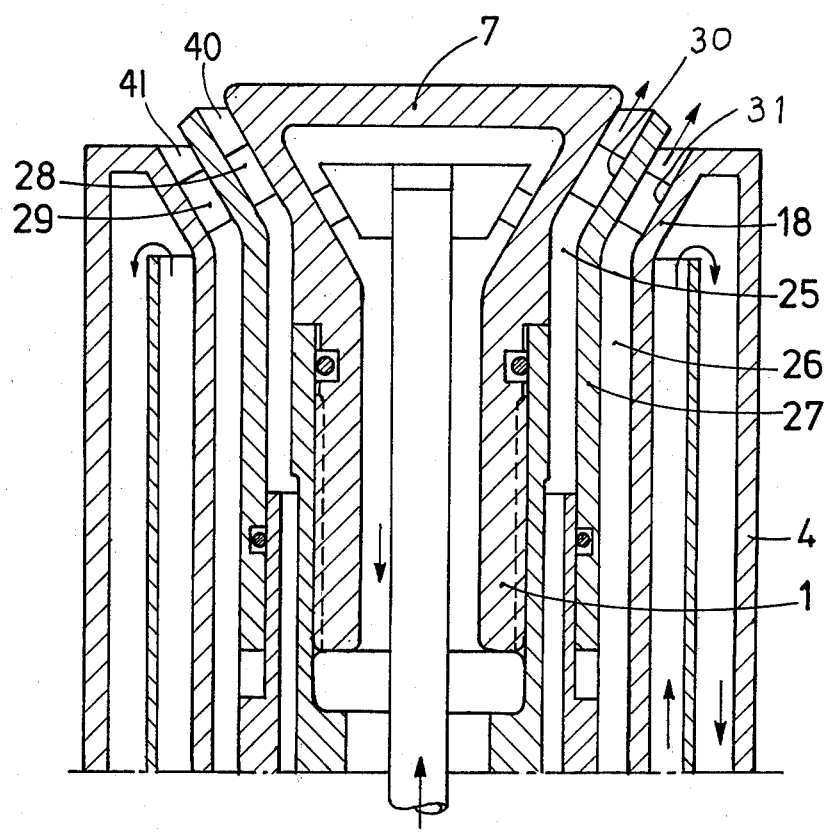
FIG. 2 is a partial axial sectional view through a burner according to the second embodiment of the invention.

With reference to FIG. 2, a second embodiment of the burner is illustrated which burner may be utilized for gaseous fuels. FIG. 2 shows only the upper portion of the burner, the lower portion of which is identical to that depicted in FIG. 1. In the gaseous fuel burner, two different annular channels 25 and 26 for fuel and oxygen-containing medium are provided which extend toward the front end of the burner independently from one another so that two concentrically positioned conical outlets 40 and 41 are formed at the nozzle of the burner. A sleeve 27 is provided in the burner to divide channels 25 and 26 from each other in the region of the burner nozzle. A plurality of spacing elements 28 and 29 are located in each outlet 40, 41, respectively. The spacing elements in each outlet are circumferentially spaced from each other to form a number of slots 30 or 31 therebetween for discharging the fuel and the oxygen-containing medium to be ignited.

In operation, the compensator 17 (not shown in FIG. 2), also mounted in prestressed position will press the front plate 7 against the conical portion 18 of the jacket 4 whereby the sleeve 27 is clamped between the hollow body 1 and the jacket 4 at the region of the nozzle. This clamping action insures the constant width of slots 30 and 31 whereby the supercritical outlet velocities of the combustible gases will be prevented.

It will be understood that each of the elements described above, or two or more together, may also find a useful application in other types of burner differing from the types described above.

While the invention has been illustrated and described as embodied in a burner, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A burner for gaseous and liquid fuels, comprising a hollow casing; a hollow body inserted into said casing such that a first annular channel is formed therebetween for feeding a fuel therethrough; a hollow jacket surrounding said casing and forming therewith a second annular channel for feeding an oxygen-containing medium therethrough, means for admitting a cooling medium into said body and said jacket and means for circulating the admitted cooling medium within said body and said jacket such that said casing and said jacket are cooled; said casing and said jacket having proximal ends and defining with one another a conical annular nozzle gap, said first and second channels communicating with said nozzle gap; a plurality of circumferentially distributed spacing elements positioned in said nozzle gap and forming between themselves respective slots for discharging a mixture of the fuel and the oxygen-containing medium from said nozzle gap; and a heat expansion compensator connecting said jacket to said casing in axially prestressed position so as to maintain said jacket and said casing in abutment with one another via said spacing elements in all operating conditions.

2. The burner of claim 1, wherein said compensator has one end rigidly secured to said jacket and a second end rigidly secured to said casing.

3. The burner of claim 2, wherein said circulating means include a third channel formed in said body to receive the cooling medium to be circulated in said body.

5. The burner of claim 3, wherein said circulating means further include a fourth channel formed in said jacket to receive the cooling medium to be circulated within said jacket.

5. The burner of claim 4, wherein said casing includes a front plate positioned at said proximal end thereof and having an outer conical surface, said jacket being formed with an inner conical surface at said proximal end thereof, said outer conical surface of said front plate defining with said inner surface of said jacket said annular nozzle gap which receives said spacing elements.

6. The burner of claim 5, further including adjusting means operative for limiting displacement of said casing when said compensator is expanded from said pre-stressed position.

7. The burner of claim 6, wherein said adjusting means include two bolts axially extended at two opposite sides of said casing and two nuts mounted thereon.

8. The burner of claim 7, further including passage means communicating said first and second channels with each other within the burner.

* * * * *